United States Patent Office 2,794,118
Patented May 28, 1957

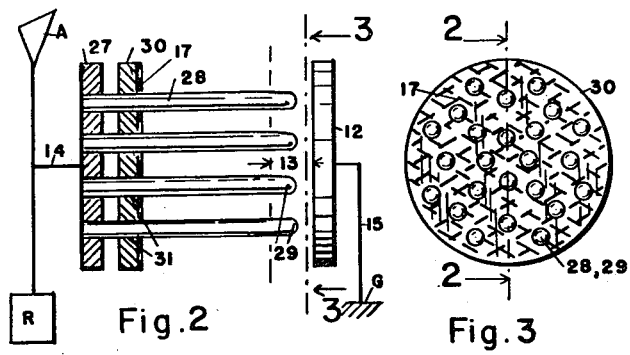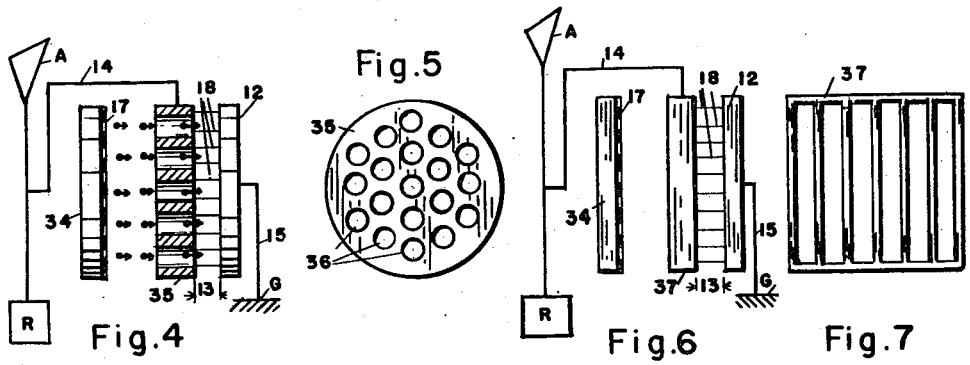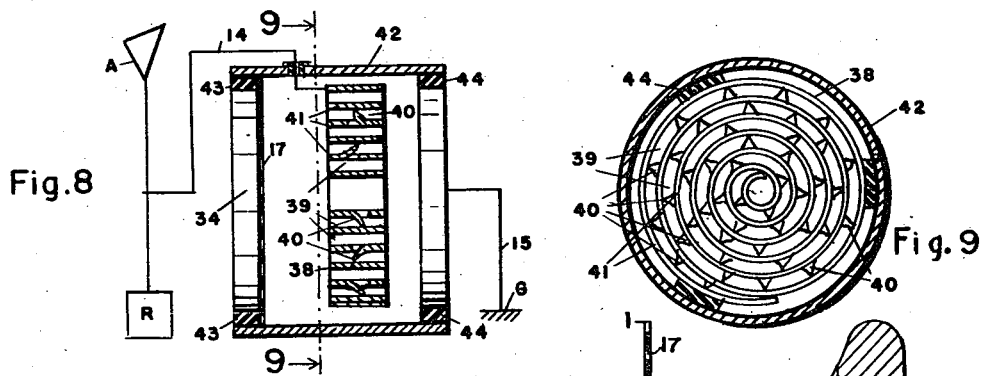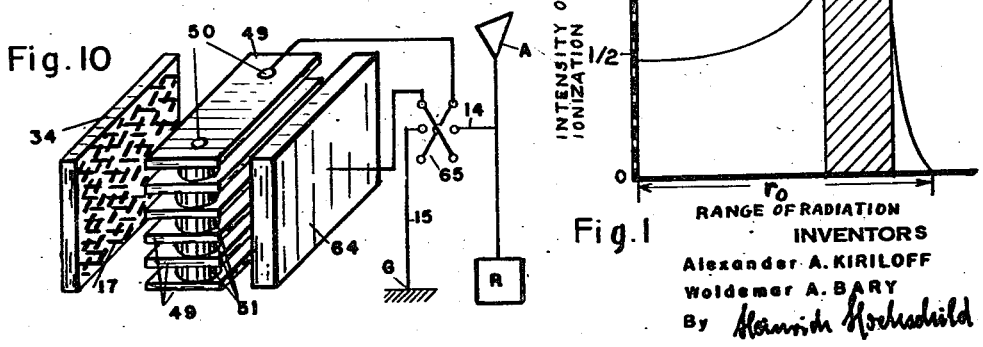

2,794,118

DEVICE FOR DEFLECTING FROM ELECTRONIC APPARATUS DISTURBANCES FROM ATMOSPHERIC AND OTHER STATICS

Alexander A. Kiriloff and Woldemar A. Bary, New York, N. Y., assignors of one-third to Boris Sergievsky, New York, N. Y.

Application February 20, 1951, Serial No. 211,946

6 Claims. (Cl. 250—20)

The invention is concerned with a device for deflecting from electronic apparatus disturbances caused by statics, particularly atmospheric statics and a primary object of the invention is a device which may be applied or connected to any such electronic apparatus as a by-path bridging the apparatus and open for the passage of the disturbances and leading off the disturbances to ground from that terminal of the apparatus where they otherwise might enter the same, a by-path, however, which is substantially closed for the oscillations which control, or are operative in, the apparatus.

The term electronic apparatus as employed in this specification and in the claims is intended to include broadcasting and television apparatus, particularly receivers and for any kind of use, stationary, or mobile on vehicles, autos, ships, and aircraft; furthermore, any kind of electrical, wave energy controlled apparatus, such as for receiving, or responding to, or registering, or measuring, or reproducing, any kind of electrical oscillations, impulses, messages, signals, or transmitting or reproducing images of any optical, electrical or magnetical configurations; or any other apparatus controlled or operated or influenced by electrical oscillations or pulses, irrespective of the mode of their production, e. g. by rotating or oscillating machines or apparatus, oscillatory circuits, spark discharge, or the like.

A further object of the invention is a deflecting device which may be applied with or connected to any such electronic apparatus or group of apparatus in common without necessitating or causing any substantial change in the electrical characteristics of the apparatus to which the deflecting device is to be connected and without affecting in any way the operation of such apparatus.

A still further object of the invention is a deflecting device which may be set to respond readily to a wide range or scale of oscillations or pulses produced in the atmosphere by statics or also such which transmitted to the atmosphere would reach or would be transmitted on the feeding or control lines of the apparatus to be protected. The period of atmospheric statics may for instance vary between $10 \times 10^{-6}$ to $300 \times 10^{-6}$ sec. and the device may be set or adjusted to respond to these definite frequencies when the frequencies of the disturbances are at variance with the controlling or operating frequencies of the apparatus to be protected. The device may further be set to take into account the large variety in the characteristics of atmospheric disturbances in accordance with the geographic location, season of the year, altitude, distance of the place of observation from the disturbance. They may vary from the form of a single sharp and well marked pulse to the form of an oscillatory discharge which as an echo accompanies the fundamental discharge of static electricity and which is caused by multiple reflections of that discharge between earth and ionosphere at a distance of 75 to 90 km. from the earth. The separation time between the pulses may thus vary, say between 35 to 225 microseconds to 300 microseconds with frequencies from say 12.5 kc./sec. to 15 kc./sec. and also from 10 to 43 mc./sec. for certain cosmic statics.

On the other hand, the device may be set to respond selectively to disturbance oscillations or other static discharges of sufficiently high potential gradients or differences.

Considering that the normal electrical field of the earth has on the surface of the earth a field strength of 100 volt/m. which decreases with the height thus as to diminish to 25 volt/m. at 1 km. height, and considering further in a thunderstorm the potential gradient may reach near the earth 100 to 150 kv./m., it is obvious that the voltage gradient of atmospheric statics will be considerably higher than that corresponding to the relatively low intensity of the wave energy transmitted as e. g. broadcast or signal energy which is utilized for the control or operation of the apparatus to be protected; the field gradient of such disturbances near the surface of the earth being for a radio receiver under normal conditions of the order of 30 to 100 volt/m.

An object of the invention therefore is the device of a by-path which is substantially closed for the normal oscillations which control or operate the apparatus to be protected which by-path however is opened through or for the disturbance oscillations or through or for the relatively high potential gradient of the disturbances to be deflected from the apparatus.

To achieve these and other objects, the device of the invention for deflecting from electronic apparatus, radio and television receivers and other apparatus controlled or operated by oscillations of electrical energy, disturbances from atmospheric or other statics, makes use of a ionized by-path which bridges for the disturbances the apparatus and connects with the ground the terminal of the apparatus at which the potential disturbances might enter the apparatus. This by-path is of the type which includes a collecting electrode and a leading-off electrode, the one connected conductively to the terminal and the other to ground, or vice versa. The electrodes, which may be made of copper, silver, aluminum, brass, or other conductive material, are arranged oppositely of each other and are spaced apart from each other to leave a gap therebetween. A carrier having a surface with radio-active material thereon is disposed in the vicinity of the gap to ionize the same by emanation from the radio-active material on this surface.

As radio-active material we prefer such substances which predominantly or exclusively emanate alpha particles since the emanation of these particles combines two advantages:

First, their high power of ionization, $k$, the number of ions which an alpha particle may produce being of the order of $10^5$ to $2 \times 10^5$.

Second, the relatively short range, $r_0$, of these rays, in the order of a few centimeters, which makes possible to confine the effect of the radiation within a definite small space which may easily be enclosed in a metallic casing, the user thus being protected from any adverse effect of the radiation.

We may thus employ any mineral material or ores which contain radio-active material particularly such radio-active material which emanates alpha particles, e. g. pitchblende, chalcocite, carnotite, autunite, monazite, or other minerals or ores containing uranium, radium, vanadium, thorium; or thorium, actinium, mesothorium salts obtained from these minerals or ores as well as metallic actinium, uranium, thorium, radium and their various derivatives, such as e. g. the very stable radium D and radium F. Ionization may also be obtained by mesothorium, 88/228 (atom number/mass number), half time 6.7 a (years), and others which emit chiefly the slow beta rays.

We may also employ radio-active isotopes with long life which emit alpha rays:

| | Radiation | $k$ | $r_0$(cm.) | half life |
|---|---|---|---|---|
| Polonium (Po), 84/208 | α | | | 3 a (years) |
| Polonium (Po), 84/210 | α | 1.5×10⁵ | 3.72 | 140 d (days) |
| Samarium (Sm), 62/152 | α | | | 1.0×10¹² a |
| Radium (Ra), 88/226 | α, β, γ | 1.36×10⁵ | 3.21 | 1622 a |
| Radium Thorium (RaTh), 90/228 | α, β | 1.53×10⁵ | 3.81 | 1.9 a |
| Thorium (Th), 90/229 | α | | | 7000 a |
| Thorium (Th), 90/232 | α | 1.23×10⁵ | 2.75 | 1.39×10¹⁰ a |
| Ionium (Io), 90/230 | α, γ | 1.31×10⁵ | 3.03 | 8×10⁴ a |
| Actinium (Ac), 89/227 | α, β | | | 13.5 a |
| Protoactinium (Pa), 90/231 | α | 1.44×10⁵ | 3.48 | 3.43×10⁴ a |
| Uranium (U), 92/232 | α | | | 70 a |
| Uranium (U), 92/233 | α | | | 1.62×10⁵ a |
| Uranium II, 92/234 | α | 1.23×10⁵ | 2.91 | 2.35×10⁵ a |
| Actinium Uranium (AcU), 92/235 | α, γ | | | 8.91×10⁸ a |
| Uranium I, 92/238 | α | 1.16×10⁵ | 2.53 | 4.51×10⁹ a |
| Neptunium Np, 93/237 | α | | | 2.2×10⁶ a |
| Plutonium Pu, 94/236 | α | | | 2.7 a |
| Plutonium Pu, 94/238 | α | | | {92 / 89 / 40} a |
| Plutonium Pu, 94/239 | α | | | 2.4×10⁴ a |
| Plutonium Pu, 94/240 | α | | | 7600 a |
| Plutonium Pu, 94/241 | α, β | | | 210 a |
| Americanium (Am), 95/241 | α, γ | | | 490 a |
| Americanium (Am), 95/242 | α, β | | | 2400 a |

This radio-active material may be applied to a carrier surface in any convenient or conventional way, such as by coating, galvanizing, cementing, or the like.

The surface with the radio-active material is so arranged that the electrically charged particles are most effective within the gap between the electrodes. The alpha or beta particles or gamma rays emitted from the radio-active material will collide with the molecules of the air or other gas contained in the gap which may be under normal atmospheric pressure or higher pressure. Positive and negative ions will thus be produced by collision and thus the space of the gap ionized and the air converted into a semi-conductor which will allow passage of, and thus open the by-path for, all disturbances of sufficiently high potential gradient which as a rule the disturbances possess. The by-path however will remain blocked for the normal oscillations of relatively low intensity which control or operate the apparatus.

Ionization may be intensified by introducing into the gap rare gases such as argon, helium, or others. To this purpose, and also for confining the radiation to a closed space, the electrodes together with the gap therebetween and with the surface carrying the radio-active material, or the whole deflecting device, may be sealed and encased in a metallic and thus shielding casing.

Configuration and dimensions of the collecting electrode and of the leading-off electrode as well as of the carrier of the radio-active material may be of great variety as to form and shape. They may be in the form of plates, or of circular or otherwise shaped discs, hollow cylinders, spheres, or others. Relative distances and relative dimensions of the electrodes will be chosen in accordance with prevailing conditions and especially for obtaining a desired capacity in agreement with the whole system so as to avoid any disturbances in the apparatus, such as a radio receiver so that resonance and frequencies are not adversely affected or the sound will not be decreased.

Ionization may be intensified by the provision of protrusions of sharp curvature, ridges, edges, points, needles, prongs, denting or others, projecting towards and into the gap on one or more of the surfaces facing the gap, i. e. the electrodes and the surface carrying the radio-active material. The electrodes may also be in the form of thin blades or strips arranged in the direction of the electrical field which with their edges of sharp curvature also promote ionization at these edges.

Thus, by proper choice of the electrical characteristics and disposition of the various elements relatively to one another, the system may be set for a highly effective deflection of statics while at the same time any disturbances in the apparatus to be protected, weakening or distortion of the signals to be received, or the like, are avoided.

The width of the gap will therefore to an essential extent depend upon the range of the emanation from the radio-active material, particularly the alpha particles here preferably considered which range as the table hereinabove shows roughly lies between 2.5 and 4.0 cm.

The gap in this instance therefore may be of the order of a fraction of one centimeter or more. Accordingly, the potential gradient of the disturbance which will bridge this gap will be rather high.

It is therefore a further object of the invention to make the width of the gap quasi independent of the range of the radiation. This end is attained at, without impeding but allowing full development of the ionization field, by choosing the width of the gap much narrower than the range of the radiation and superimposing this narrow gap upon that part or zone of the ionization field where the maximum ionization is produced by the radio-active material.

This is achieved when, in accordance with the invention, the radio-active material is applied to a carrier, separate from the electrodes, such that the surface with the radio-active material thereon is extended transversely of the general direction of the field to be produced between the electrodes. One of the electrodes is apertured or built up with passages between conductive parts thereof and the carrier is disposed relatively to this electrode and transversely of the passages therethrough so as to emit from the radio-active material thereon electrically charged particles through the passages into the gap. The carrier is further disposed relatively to the electrodes and a distance apart from the gap such that the gap substantially coincides with the zone of maximum ionization produced by the radio-active material of the surface.

Owing to the free passage of the electric and electrically charged particles through the apertured electrode, the width of the gap may be chosen within the optimum position, the part of highest ionization of the field produced by the radio-active material but, otherwise, is independent of the range of this field. Moreover, the general direction of the path of the electric and electrically charged particles and the general direction of the electrical field produced by the disturbances between the electrodes will coincide.

The apertured electrodes may be of varied types. Some embodiments will be specifically described hereinafter.

These and further objects and features of the invention will become apparent as the specification proceeds and various embodiments of the invention will be illustrated in and by the accompanying drawings which form part of this specification and which are to be understood explicative of the invention and not limitative of its scope.

These drawings show various embodiments of the invention rather diagrammatically and by way of example. Other embodiments incorporating the principles underlying our invention are feasible without departing from the spirit and ambit of our appended claims.

In the drawings:

Fig. 1 is a diagram of the intensity of ionization dependent upon the distance from the emitting surface;

Fig. 2 is a longitudinal section along line 2—2 of Fig. 3.

Fig. 3 is a front view from line 3—3 of Fig. 2 of a deflecting device with a perforate carrier of the radio-active material riding on protrusions of a collecting electrode;

Fig. 4 is a longitudinal view partly in section of an embodiment where the collecting electrode is apertured;

Fig. 5 is a front view of the electrode of Fig. 4;

Fig. 6 is a longitudinal view of an embodiment with the collecting electrode in form of a grid;

Fig. 7 is a front view of the grid of Fig. 6;

Fig. 8 is a longitudinal section of an embodiment with a spirally wound coil as apertured electrode, and Fig. 9 is a section along line 9—9 of Fig. 8 showing a front view of the coil of Fig. 8.

Fig. 10 is a perspective of a device with a set of spaced strips as an apertured electrode.

Figure 11:
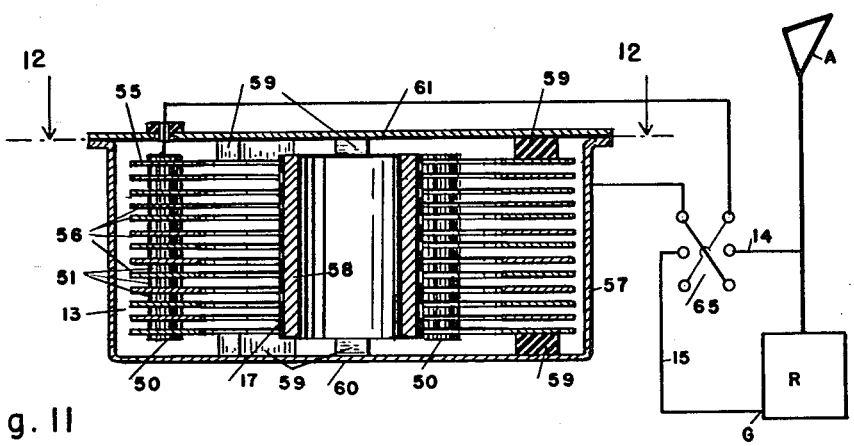
Figs. 11 and 12 respectively are a cross section on line 11—11 of Fig. 12 and a top view of another embodiment, a set of spaced ring strips serving as apertured electrode.

In the embodiments of the invention, the distance between gap and emanating surface is so chosen that the gap is in the reach of the ionization field of the emanating surface particularly in the zone of maximum ionization.

Fig. 1 illustrates this relationship for the 84/210 isotope of polonium.

The ionization sets in with half the maximum intensity and reaches its maximum at a distance of about 3 cm., immediately before the absorption sets in and is completed at the end of the range of 3.8 cm. The distance of the gap from the emanating surface thus will be chosen so that the hatched part of the diagram, the zone of maximum ionization, coincides with the gap.

In Fig. 1 and also in subsequent figures, the emanating surface 17 of the radio-active material supported by the carrier is indicated by a heavy broken line.

The radio-active material may be applied to the carrier in any convenient or conventional form and by any convenient or conventional method, these forms and methods not being described here since they do not form part of this invention.

Alpha particles or, the case given, beta particles or gamma photons, or several of them, schematically indicated on the drawings by small circles with arrows, will be emitted from surface 17 and will collide with the particles or molecules of the air or other gas within the gap and will thus ionize this gap, and convert it into a semiconductor through which disturbances of sufficiently high gradient may pass and thus bypass the apparatus to be protected. The electric field produced in the gap by the disturbances is indicated by the straight lines 18, see Fig. 4.

In the drawings, the electronic apparatus as defined hereinabove, for instance a radio or television receiver to be protected against static is designated generally by "R."

"A" is the antenna or any other terminal of the apparatus or of the device itself where disturbances from atmospheric or other static might enter along conductors the apparatus or may otherwise be received by the device. "G" is the "ground" in its widest meaning such as earth or the chassis of the apparatus or of an aircraft or car on which the apparatus may be mounted or any other part of the structure which carries the apparatus or the device and to which the second terminal of the apparatus or of the device or both might be connected.

Figs. 2 to 12 illustrate various embodiments of the invention where the gap between the electrodes is superimposed upon the zone of maximum ionization produced by the radio-active material. In the embodiments of these figures, the carrier is arranged transversely or across this direction so that the emitted particles travel generally in the direction of this field.

Since as a rule the width of the gap in arrangements of this type will be considerably narrower than the distance —in the instance of polonium 84/210, Fig. 1, of three centimeters—necessary for the development of maximum ionization, in accordance with this development of the invention, one of the two, the carrier of the surface with radio-active material or an electrode is perforate or apertured. Either, as Figs. 2 and 3 exemplify, will thus protrusions of the electrode penetrate the carrier and reach the zone of maximum ionization, or, as Figs. 4 to 12 exemplify, the electrode is permeable for the electric particles emitted from the radio-active surface.

In the embodiment of Figs. 2 and 3, the collecting electrode is designated by 27, the leading-off electrode by 12. The collecting electrode is conductively connected over line 14 with the antenna, the leading-off electrode 12 over line 15 with the ground. The collecting electrode 27 is provided with protrusions 28 in the form of prongs or needles defining with their tips 29 and the leading-off electrode 12 the gap 13. Electrodes and gap together with the conductive elements 14 and 15 constitute a by-path bridging the apparatus "R" and connecting with the ground the terminal here antenna "A," at which the potential disturbances might enter the apparatus. The carrier disc 30 is provided with perforations 31 by means of which it rides on the needles or prongs 28. By properly choosing the length of the needles 28, the distance of the carrier disc 30 from the leading-off electrode 12 and the effective width of the gap can be set to any desired degree of precision.

Figs. 4, 5 and 6, 7 illustrate two embodiments where one of the electrodes is apertured or perforate, which normally serves as the collecting electrode, if it is not desired to change the polarity of the electrodes should the potential of the disturbance be lower or more negative than that of the earth. The carrier 34 with the surface 17 carrying the radio-active material is extended transversely of the general direction of the field (18) to be produced between the collecting electrode, 35 and 37 respectively, and the leading-off electrode 12, and disposed to the rear of the collecting electrode 35, 37 respectively, at their reverse side relatively to the gap 13. In the instance of Figs. 4, 5, the apertured electrode 35 is a disc provided with bores 36, whereas in the case of Figs. 6, 7, the collecting electrode 37 is a grid.

The apertured electrode may also be the leading-off electrode, or a change-over switch 65 may be arranged, as shown in Figs. 10 and 11, for reversing the function of the electrodes if so required or desired. Or, both electrodes may be apertured, both then having a carrier for the radio-active material to their rear.

The term "apertured" or "perforate" electrode as here employed is to be understood to comprise any configuration which provides passages for the electric or electrically charged particles emitted from the radio-active material to pass therethrough.

Apertured electrodes may thus be perforated plates or discs of any type, sieves, grids, or the like. Or they may be wound up from a strip 41 of thin conductive material as a coil 38, as Figs. 8 and 9 illustrate, with interstices 39 between the windings 41, which may be secured by spacers, or simply by denting the strip and bending the teeth 40 outwards of the strip as shown in Fig. 9.

The device may be encased in a sealing and shielding cylinder 42 which is insulated, for instance by insulating blocks 43, 44 from the electrodes 41 and 12 and from the carrier 43.

The apertured electrode may also be in the form of a set of spaced parallel strips of conductive material. The strips are electrically connected with one another as illustrated in Fig. 10 and in Figs. 11 and 12. The thin strips 41, 49 and 55 of Figs. 8 to 12 lying in the general direction of the field intensify at their edges of sharp curvature the electrical field thereabout and thus have the same effect as the other protrusions as hereinbefore described and also of the teeth of Fig. 9.

In the embodiment of Fig. 10 the strips 49 of conductive material are held and electrically connected together by bolts 50 and washers or spacers 51 which simultaneously serve to connect conductively with one another the spaced strips 49.

The set of strips serves as collecting electrode when the potential of the disturbance is higher than that of the earth. The change-over switch is then in its upper position thus connecting the set of strips 49 as collecting electrode with the antenna or terminal at which the disturbances are received whereas the second electrode 64 as leading-off electrode is connected with the ground.

Should the potential of the disturbances to be expected be lower than that of the earth, the switch will be turned into its other, lower position in which electrode 64 will be the collecting electrode connected with the antenna or terminal whilst the set of strips will serve as leading-off electrode connected with the ground.

The electric or electrically charged particles emitted from surface 17 on carrier 34 pass through the interstices or apertures between the strips or plates 49 before they reach the gap and finally electrode 64.

Figure 12:
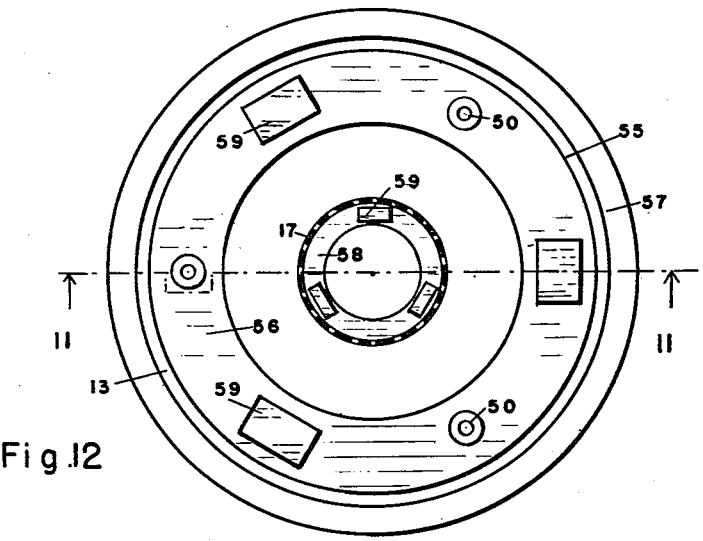

Figs. 11 and 12 illustrate a highly effective arrangement where the apertured electrode generally designated by 55 is constituted by a set of superposed thin ring discs 56 held and electrically connected together by bolts 50 and spacing washers 51.

The set 55 of ring discs is coaxial with two cylinders, an outer cylinder 57 and an inner cylinder 58. The inner cylinder serves to carry on its outer peripheral surface 17 the radio-active material whilst the outer cylinder 57 serves as one of the electrodes, normally, with higher potential of the disturbances than that of the earth or the ground, as leading-off electrode—upper position of the change-over switch 65—thus connected over line 15 with the ground or the second terminal of the apparatus to be protected.

Clearance provided between the outer cylinder 57 and the set 55 of ring discs serves as gap 13.

The parts are properly supported, for instance by insulating blocks 59 and held within the outer cylinder 57 which when provided with bottom 60 and lid 61 may serve as a shielding and sealing casing in order to confine the radiation within the casing. The casing may be filled with atmospheric air, or, if desired, with a rare gas under normal or increased pressure.

Since all essential parts are circular or cylindrical, they may be manufactured with great precision and, if so desired, the width of the gap, 13, may be reduced as narrow as to a fraction of a millimeter. Moreover the blades may be made of extremely thin sheets, e. g. even below 18/1000 of an inch (0.46 mm.).

This has the further advantage that the ionization effect of their edges is very high so that in some instances fewer, thinner discs may replace a greater number of thicker discs or strips with the same ionization effect.

The electrical characteristics of the apparatus particularly its capacitance may be set at will by properly dimensioning the parts: thickness and width of the ring discs, their number and spacing, width of the gap, height of the set and of the cylinders.

As a rule, the capacitance relatively to the other electrode of the thin blades, owing to their thinness and thus the sharp curvature of the edges, further owing to their arrangement parallel to or in the direction of the electric field will be rather small or of the order of some picofarads ($10^{-12}$ farad). If desired, the effective capacitance of the deflecting device of the invention may be increased or reduced by known and conventional means, condenser, trimmer, in series with the device for reducing the capacitance, or condenser, padder, parallel to the device for increasing the capacitance, or the capacity may also be reduced by providing apertures in one or both electrodes.

We claim:

1. In a device for deflecting from electronic apparatus disturbances from atmospheric and other statics by means of a collecting electrode and a leading-off electrode, the one conductively connected to a terminal where the potential disturbances might be received and the other to ground and both arranged so as to face each other and being spaced apart from each other to leave a gap therebetween; at least one of said electrodes being apertured, said device further including a carrier, separate from said electrodes, having a surface with radio-active material thereon being extended transversely of the general direction of the field to be produced between said electrodes, said carrier being disposed relatively to said gap at the reverse side of said apertured electrode; passages for the electrically charged particles emitted from said carrier thus being provided through said apertured electrode into said gap; said carrier with its surface having radio-active material thereon disposed a distance apart from said apertured electrode and said gap such that said gap substantially coincides with the zone of maximum ionization produced by said radio-active material.

2. A device as set forth in claim 1 wherein said apertured electrode comprises a set of spaced, parallel, flat strips and means for electrically connecting the same.

3. A device as set forth in claim 2 wherein said means for electrically connecting said strips constitute simultaneously spacing means for said strips.

4. A device as set forth in claim 1 wherein said apertured electrode is constituted by a coil wound up spirally from a flat strip whereas the other electrode and the carrier with the surface having the radio-active material thereon are plates facing from opposite sides said spirally wound coil.

5. A device as set forth in claim 1 wherein said carrier is a cylinder with its outer surface having radio-active material thereon, and one of said electrodes is likewise a cylinder coaxial with the first and surrounding the same, whereas the other electrode is apertured by being constituted by a set of superposed and electrically connected ring discs of sheet material each, said set disposed coaxially with both said cylinders between the same with clearance from at least the outer cylinder, this clearance constituting said gap, said cylinders and said discs being dimensioned so that the gap substantially coincides with the zone of maximum ionization emanating from the surface of the inner cylinder with radio-active material thereon.

6. In a device for deflecting from electronic apparatus disturbances from atmospheric and other statics by means of a collecting electrode and a leading-off electrode, the one conductively connected to a terminal where the potential disturbances might be received and the other to ground and both arranged relatively to each other and being spaced from each other so as to leave a gap therebetween; a carrier, separate from said electrodes, having a surface with radio-active material thereon being extended transversely of the general direction of the field to be produced between said electrodes; one of said electrodes being built up with passages between conductive parts thereof, said carrier being disposed relatively to said electrode and transversely of said passages so as to emit from said surface with radio-active material thereon electrically charged particles through said passages into said gap, said carrier being further disposed relatively to said electrodes and a distance apart from said gap so that the gap substantially coincides with the zone of maximum ionization produced by said radio-active material of said surface.

References Cited in the file of this patent

UNITED STATES PATENTS

| | | |
|---|---|---|
| 1,035,958 | Girardeau | Aug. 20, 1912 |
| 1,180,732 | Moszkowski | Apr. 25, 1916 |
| 1,225,333 | Hewitt | May 8, 1917 |
| 1,249,429 | Lewis | Dec. 11, 1917 |
| 1,504,600 | Brackett | Aug. 12, 1924 |
| 1,885,959 | Stevens | Nov. 1, 1932 |
| 1,930,088 | Foulke | Oct. 10, 1933 |
| 2,022,140 | Michel | Nov. 26, 1935 |
| 2,112,097 | Johnson | Mar. 22, 1938 |
| 2,413,171 | Clifford et al. | Dec. 24, 1946 |
| 2,415,962 | Okress | Feb. 18, 1947 |
| 2,449,961 | Treece et al. | Sept. 21, 1948 |
| 2,570,893 | Wilkes | Oct. 9, 1951 |

OTHER REFERENCES

"Static Removed with a Solution of Salt Water," Radio Digest Illustrated, September 2, 1922.